(12) United States Patent
Chen

(10) Patent No.: US 10,747,964 B2
(45) Date of Patent: Aug. 18, 2020

(54) CARD READER DEVICE

(71) Applicant: CASTLES TECHNOLOGY CO., LTD., New Taipei (TW)

(72) Inventor: Chun-Yu Chen, Taipei (TW)

(73) Assignee: CASTLES TECHNOLOGY CO., LTD. (TW)

( * ) Notice: Subject to any disclaimer, the term of this patent is extended or adjusted under 35 U.S.C. 154(b) by 0 days.

(21) Appl. No.: 16/157,308

(22) Filed: Oct. 11, 2018

(65) Prior Publication Data
US 2020/0117862 A1 Apr. 16, 2020

(51) Int. Cl.
| | |
|---|---|
| *G06K 7/00* | (2006.01) |
| *G06F 3/0488* | (2013.01) |
| *G06F 3/02* | (2006.01) |
| *G06F 21/31* | (2013.01) |
| *G06K 7/10* | (2006.01) |
| *G06K 7/14* | (2006.01) |

(52) U.S. Cl.
CPC ......... *G06K 7/0004* (2013.01); *G06F 3/0202* (2013.01); *G06F 3/04886* (2013.01); *G06F 21/31* (2013.01); *G06K 7/0013* (2013.01); *G06K 7/10297* (2013.01); *G06K 7/10366* (2013.01); *G06K 7/1413* (2013.01)

(58) Field of Classification Search
CPC .................................................... G06K 7/0004
USPC ................................................. 235/440, 375
See application file for complete search history.

(56) References Cited

U.S. PATENT DOCUMENTS

2013/0098987 A1* 4/2013 Jimenez Lamo .... G09B 21/006
235/375

* cited by examiner

*Primary Examiner* — Allyson N Trail

(57) ABSTRACT

Disclosures of the present invention describe a card reader device, which consists of a card reader unit, a human-machine interface and a physical keyboard. The human-machine interface is configured to show a first virtual keyboard comprising a plurality of first virtual buttons for a visually unimpaired to input a password thereon. Besides, the physical keyboard comprises a plurality of physical buttons formed with an embossed braille thereon. According to particular design of the present invention, a plurality of the second virtual buttons are showed on the human-machine interface, such that the plurality of physical buttons correspond to the plurality of second virtual buttons, respectively. Consequently, a blind user or a visually impaired is facilitated so as to be capable of completing a password input of the card reader unit through the physical keyboard.

11 Claims, 5 Drawing Sheets

CARD READER DEVICE

BACKGROUND OF THE INVENTION

1. Field of the Invention

The present invention relates to technology filed of card readers, and more particularly to a card reader device for facilitating visually unimpaired and visually impaired be able to input their card password with safety.

2. Description of the Prior Art

Nowadays, high-technology electronic devices make consumers change their habit of paying. For example, consumers finish their payment transactions by the use of a specific financial transaction tool except for cash. The specific financial transaction tool can be credit card, debit card, chip card, prepaid card, or electronic wallet.

Although the various financial transaction tools have been widely applied in payment transaction, consumers still worry about the security of payment and owner identification during the payment transaction. Therefore, before the payment transaction is made to be effective, a consumer is demanded to input a specific password for confirming consumer's identity through a specific electronic device like card reader. FIG. 1 shows a stereo view of a conventional point of sale (POS) system. As shown in FIG. 1, the conventional POS system 1' mainly comprises: a card reader 11' and a touchscreen 12', wherein a financial card 2' such as credit card can be accessed by the card reader 11' for carrying out a payment transaction after being inserted in to a card receiving groove of the card reader 11'. Before the payment transaction is made to be effective, the touchscreen 12' would show a virtual keyboard 13' comprising a plurality of virtual buttons 131' randomly arranged for a user to input a password thereon. After the password is inputted successfully, the POS system 1' transmits user data comprising card No. and user identity to a database of a bank for identity authentication. As a result, the user pays his bill payment by the use of the financial card, without using cash.

However, the POS system 1' is just designed for visually unimpaired. It is extrapolated that, it is difficult or even impossible for any blind users to recognize each of the virtual buttons 131', so as to finish their password input. Besides, when the blind user input the password, the password is easily peeked by other people with normal sight.

Through above descriptions, it is known that the conventional POS system integrated with card reader still show drawbacks and shortcomings. In view of that, inventors of the present application have made great efforts to make inventive research thereon and eventually provided a card reader device.

SUMMARY OF THE INVENTION

The primary objective of the present invention is to provide a card reader device, comprising: a card reader unit, a human-machine interface, a physical keyboard, and a conversion unit. The human-machine interface is configured to show a first virtual keyboard comprising a plurality of first virtual buttons randomly arranged for a visually unimpaired to input a password thereon. More particularly, the physical keyboard comprises a plurality of physical buttons, and each of the physical buttons is provided with an embossed braille thereon. According to particular design of the present invention, a plurality of the second virtual buttons are showed on the human-machine interface, such that the plurality of physical buttons correspond to the plurality of second virtual buttons, respectively. Consequently, a blind or a visually impaired is facilitated to complete a password input of the card reader unit through the physical keyboard.

For achieving the primary objective of the present invention, the inventor of the present invention provides an embodiment for the card reader device, comprising: a card reader unit;
a human-machine interface, being electrically connected to the card reader unit; wherein the human-machine interface is configured to show a first virtual keyboard comprising a plurality of first virtual buttons randomly arranged for a visually unimpaired to input a password thereon;
a physical keyboard, being integrated on the human-machine interface, and comprising a plurality of physical buttons; wherein each of the physical buttons is provided with an embossed braille; and
a conversion unit, being provided in the human-machine interface for identifying a plurality of first virtual positions of the plurality of first virtual buttons, so as to correspondingly convert the first virtual positions to a plurality of a plurality of second virtual positions;
wherein the conversion unit shows a second virtual keyboard comprising a plurality of second virtual buttons through the human-machine interface;
wherein each of the plurality of second virtual buttons is identified to have one second virtual position, such that the plurality of physical buttons are corresponding to the plurality of second virtual buttons, so as to make a visually impaired be capable of completing a safety password input of the card reader unit through the physical keyboard.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a card reader device, embodiments of the present invention will be described in detail with reference to the attached drawings hereinafter.

Figure 2:
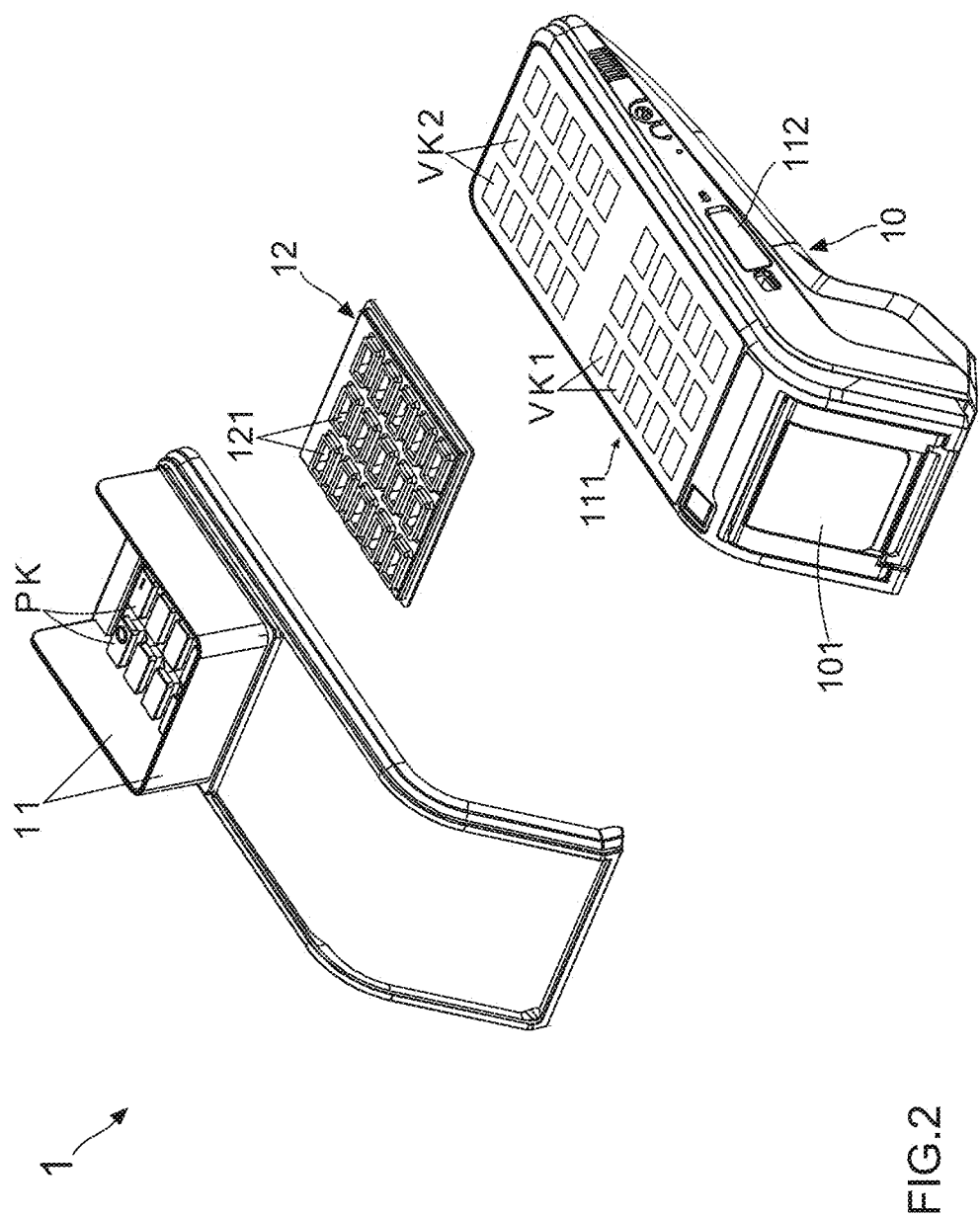
FIG. 2 shows a first stereo diagram of a card reader device according to the present invention.
Figure 3:
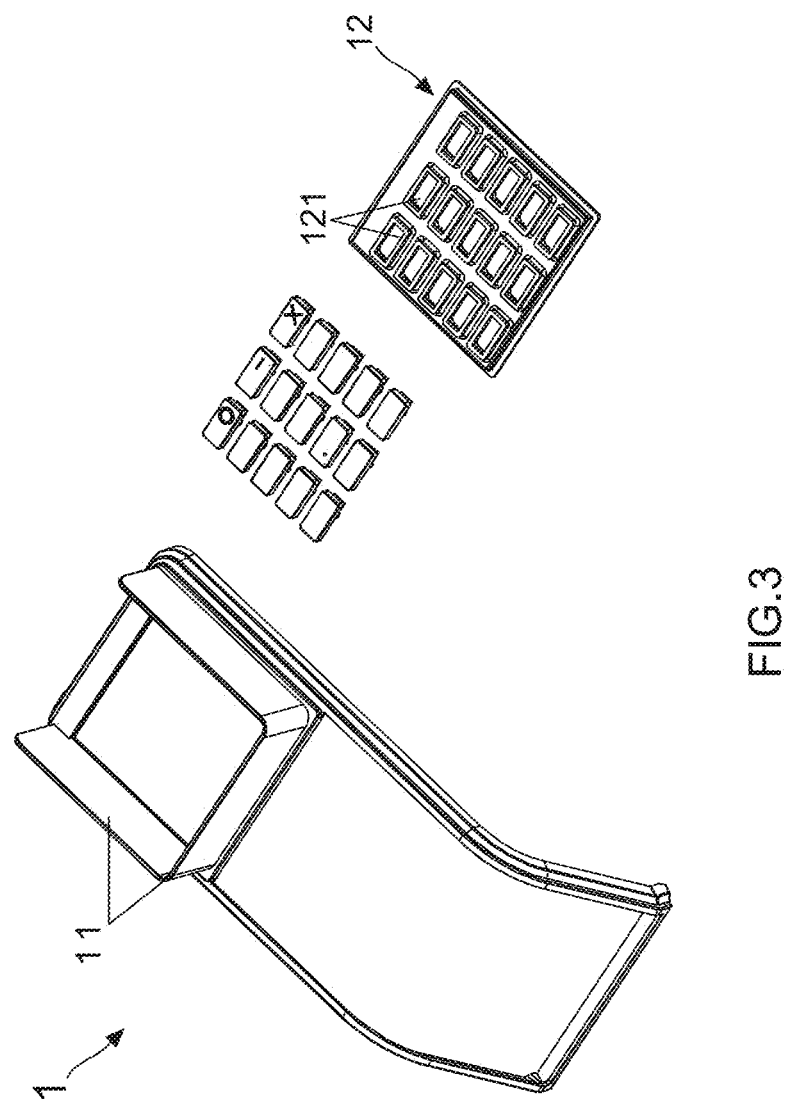
FIG. 3 shows a second stereo diagram of the card reader device.

With reference to FIG. 2, there is provided a first stereo diagram of a card reader device according to the present invention. Moreover, FIG. 3 shows a second stereo diagram of the card reader device. The card reader device 1 of the present invention comprises: a card reader unit 101, a human-machine interface 111, a physical keyboard PK, and a conversion unit, wherein the human machine 111 is electrically connected to the card reader unit 101. As explained in more detail below, the human-machine interface 111 is configured to show a first virtual keyboard VK1 comprising a plurality of first virtual buttons randomly arranged for a visually unimpaired to input a password thereon.

Continuously referring to FIG. 2 and FIG. 3, in which the physical keyboard PK is integrated on the human-machine interface 111, and comprises a plurality of physical buttons formed with a braille embossed thereon. Particularly, a conversion unit is provided in the human-machine interface 111 for identifying a plurality of first virtual positions of the plurality of first virtual buttons, so as to correspondingly convert the first virtual positions to a plurality of second virtual positions. By such arrangements, the conversion unit shows a second virtual keyboard VK2 comprising a plurality of second virtual buttons through the human-machine interface 111, and then makes each of the plurality of second buttons be identified to have one second virtual position. Therefore, the plurality of second virtual buttons are able to correspond to the plurality of physical buttons, respectively. Consequently, a blind user or a visually impaired is facilitated so as to be capable of completing a safety password input of the card reader unit 101 through the physical keyboard PK. It needs to further explain that, the card reader device 1 further comprises a plurality of anchor points. More particularly, the plurality of anchor points are disposed on the lower surface of physical keyboard PK, such that the human-machine 111 make the plurality of second virtual buttons individually correspond to the plurality of physical buttons based on the plurality of contact position of anchor points.

Inheriting to above descriptions, the card reader device 101 accesses a card from a visually unimpaired or a visually impaired based on radio frequency identification technology (RFID) or near field communication technology (NFC). Besides, the card reader device 101 also accesses a card from the visually unimpaired or the visually impaired based on bar code scanning technology, magnetic strip card decoding technology or smart card identify technology. It is worth explaining that, the human-machine interface 111 is selected from group consisting of tablet PC, laptop computer having touchscreen, all-in-one touch computer, smartphone, portable point of sale (POS) device having touchscreen, and POS device having touchscreen.

Figure 4:
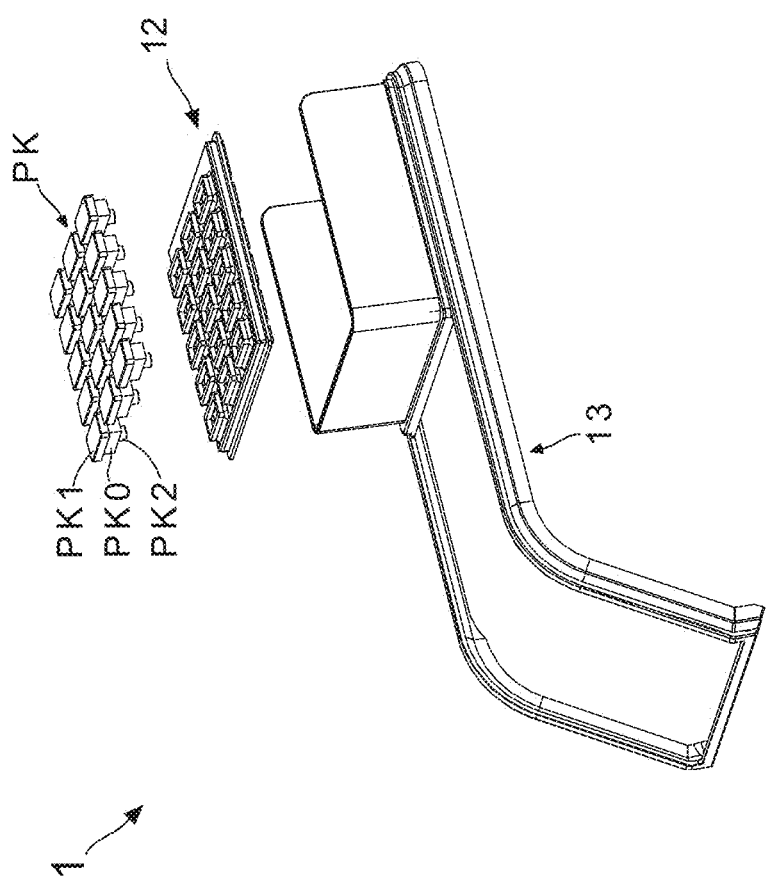
FIG. 4 shows a third stereo diagram of the card reader device.
Figure 5:
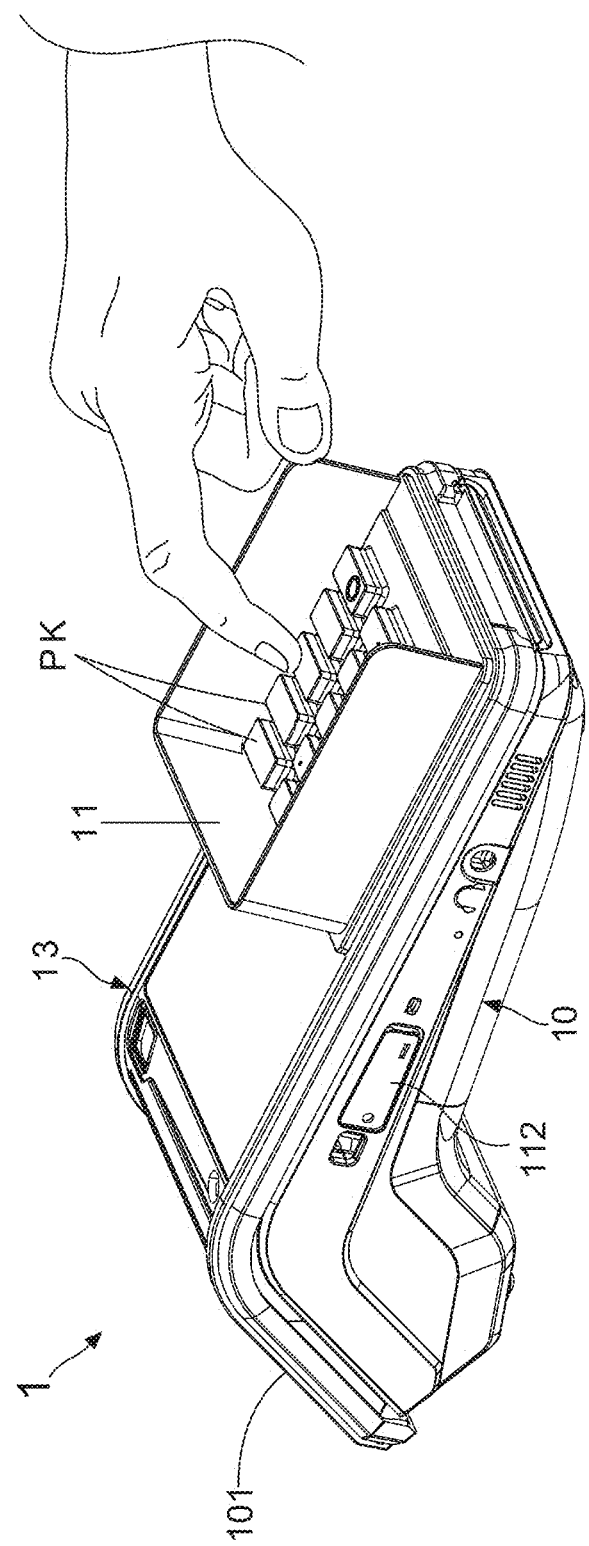
FIG. 5 shows a fourth stereo diagram of the card reader device.

Referring to FIG. 2 and FIG. 3 again, and please simultaneously refer to FIG. 4 and FIG. 5, which illustrates a third and a fourth stereo diagrams of the card reader device. FIG. 2, FIG. 3 and FIG. 4 5 depict that the card reader device 1 of the present invention further comprises a shielding unit 11, a position limitation member 12, an activating unit 112, and a frame 13. The shielding unit 11 is disposed on the human-machine interface 111 for shielding the physical keyboard, and the position limitation member 12 is disposed on the human-machine interface 111 and having a plurality of position limitation grooves. It needs to further explain that, the plurality of physical buttons are limited in the plurality of position limitation element 121, respectively. According to particular design of the present invention, the activating unit 112, disposed on the human-machine interface 111 and connected to the conversion unit, is configured to activate conversion unit.

Continuously referring to FIG. 2, FIG. 3, FIG. 4 and FIG. 5, which shows a fourth stereo diagram of the card reader device. In the present invention, the shielding unit 11 comprises three side plates, and a frame 13 is disposed on the human-machine interface 111, so as to make the card reader unit 101, the human-machine interface 111, and the physical keyboard PK be accommodated in the frame member 13. It is worth explaining that, the frame 13 is along the edge of human-machine interface 111 to increase stability of the card reader device 1. It is needs to specifically explain that, each of the physical buttons comprises: a base PK0, a pressing plate PK1 and a touch head PK2; wherein the base PK0 is accommodated in the position limitation grooves, and the pressing plate PK1 is connected to the bottom surface of the base PK0. In addition, the touch head PK2 is connected to the bottom surface of base PK0 for correspondingly pressing or touching the second virtual button.

Figure 1:
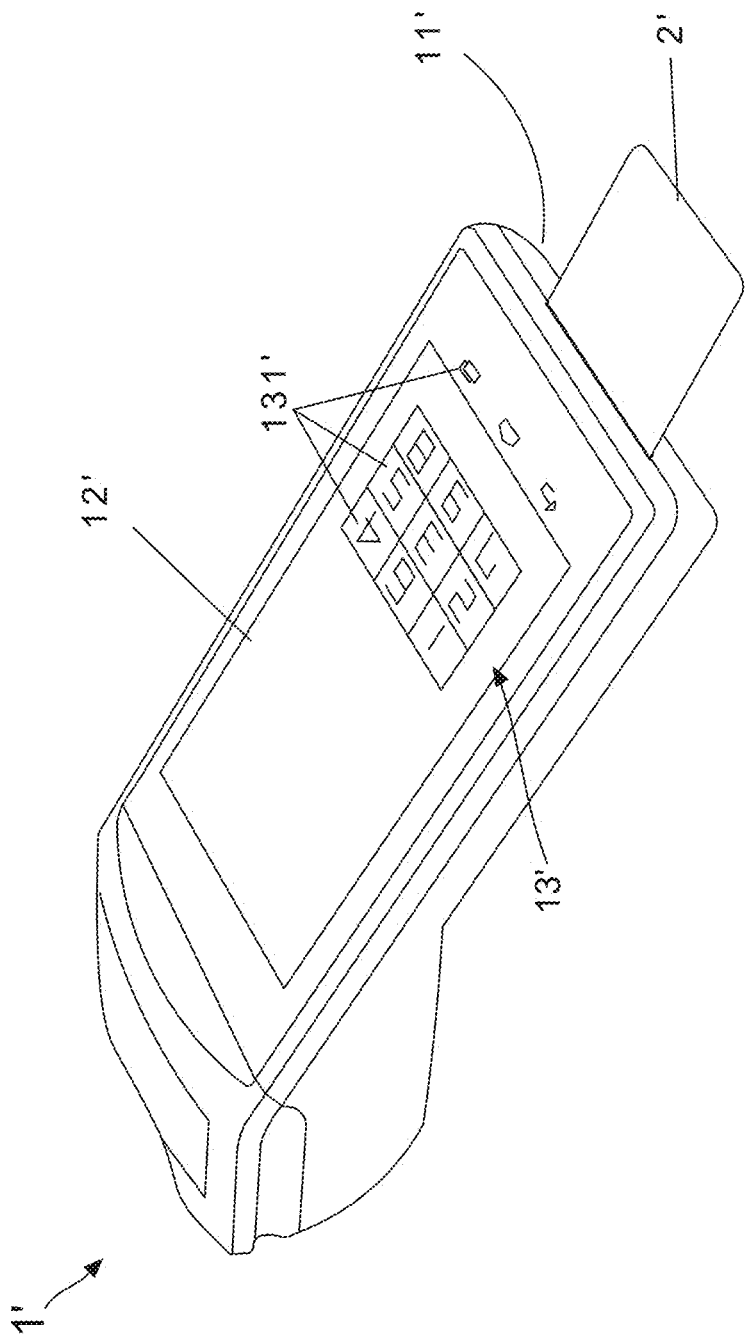
FIG. 1 shows a stereo diagram of a conventional point of sale (POS) system.

Through above descriptions, the card reader device of present invention has been introduced completely and clearly; in summary, the present invention includes the advantages of:

(1) In view of conventional POS system 1' shown in FIG. 1 being unable to allow visually impaired to complete a password input, the present invention particularly discloses a card reader device for facilitating visually unimpaired and visually impaired be able to input their card password with safety. The card reader device comprises: a card reader unit, a human-machine interface, a physical keyboard, and a conversion unit. The human-machine interface is configured to show a first virtual keyboard comprising a plurality of first virtual buttons randomly arranged for a visually unimpaired to input a password thereon. More particularly, the physical keyboard comprises a plurality of physical buttons, and each of the physical buttons is provided with an embossed braille thereon. According to particular design of the present invention, a plurality of second virtual buttons are showed on the human-machine interface, such that the plurality of physical buttons correspond to the plurality of second virtual buttons, respectively. Consequently, make a blind user or a visually impaired is facilitated so as to be capable of completing a password input of the card reader unit through the physical keyboard. Briefly speaking, this novel card reader device makes both visually impaired and visually unimpaired finish a safety password input of the card reader unit.

The above description is made on embodiments of the present invention. However, the embodiments are not intended to limit scope of the present invention, and all equivalent implementations or alterations within the spirit of the present invention still fall within the scope of the present invention.

What is claimed is:
1. A card reader device, comprising:
 a card reader unit;
 a human-machine interface, being electrically connected to the card reader unit; wherein the human-machine interface is configured to show a first virtual keyboard comprising a plurality of first virtual buttons randomly arranged for a visually unimpaired to input a password thereon;
 a physical keyboard, being integrated on the human-machine interface, and comprising a plurality of physical buttons; wherein each of the physical buttons is provided with an embossed braille; and
 a conversion unit, being provided in the human-machine interface for identifying a plurality of first virtual positions of the plurality of first virtual buttons, so as to correspondingly convert the first virtual positions to a plurality of second virtual positions;
 wherein the conversion unit shows a second virtual keyboard comprising a plurality of second virtual buttons through the human-machine interface;
 wherein each of the plurality of second virtual buttons is identified to have one second virtual position, such that the plurality of second virtual buttons are able to individually correspond to the plurality of physical buttons, so as to make a visually impaired be capable of completing a safety password input of the card reader unit 101 through the physical keyboard.

2. The card reader device of claim 1, further comprising:

a plurality of anchor points, being disposed on the lower surface of physical keyboard; wherein the human-machine interface, make the plurality of second virtual buttons individually correspond to the plurality of physical buttons based on the plurality of contact position of anchor points.

3. The card reader device of claim 1, wherein the card reader unit accessing a card from the visually unimpaired or the visually impaired based on radio frequency identification technology (RFID) or near field communication technology (NFC).

4. The card reader device of claim 1, wherein the card reader unit accessing a card from the visually unimpaired or the visually impaired based on bar code scanning technology, magnetic strip card decoding technology or smart card identify technology.

5. The card reader device of claim 1, wherein the human-machine interface is selected from group consisting of tablet PC, laptop computer having touchscreen, all-in-one touch computer, smartphone, portable point of sale (POS) device having touchscreen, and POS device having touchscreen.

6. The card reader device of claim 1, further comprising:
a shielding unit, being disposed on the human-machine interface for shielding the physical keyboard.

7. The card reader device of claim 6, wherein the shielding unit comprises three side plates.

8. The card reader device of claim 6, further comprising:
a frame, being disposed on the human-machine interface, so as to make the card reader unit, the human-machine interface, and the physical keyboard be accommodated in the frame member.

9. The card reader device of claim 1, further comprising:
a position limitation member, being disposed on the human-machine interface and having a plurality of position limitation grooves; wherein the plurality of physical buttons are limited in the plurality of position limitation grooves, respectively.

10. The card reader device of claim 9, wherein each of the physical buttons comprises:
a base, being accommodated in the position limitation grooves;
a pressing plate, being connected to the surface of the base; and
a touch head, being connected to the bottom surface of the base for correspondingly pressing or touching the second virtual button.

11. The card reader device of claim 1, further comprising:
an activating unit, being disposed on the human-machine interface and connected to the conversion unit, and being configured to activate the conversion unit.

* * * * *